United States Patent
Chan et al.

(10) Patent No.: US 9,382,936 B2
(45) Date of Patent: Jul. 5, 2016

(54) THREADED INSERT WITH THERMAL INSULATION CAPABILITY

(71) Applicant: Avago Technologies General IP (Singapore) Pte. Ltd., Singapore (SG)

(72) Inventors: Chuan Hoe Chan, Perak (MY); Choon Guan Ko, Penang (MY); Yi Feng Hwang, Penang (MY); Jun Tan, Kedah (MY)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 414 days.

(21) Appl. No.: 13/720,367

(22) Filed: Dec. 19, 2012

(65) Prior Publication Data

US 2014/0165369 A1 Jun. 19, 2014

(51) Int. Cl.
*F16B 33/00* (2006.01)
*F16B 37/12* (2006.01)

(52) U.S. Cl.
CPC ............. *F16B 33/004* (2013.01); *F16B 33/006* (2013.01); *F16B 37/122* (2013.01); *F16B 37/125* (2013.01); *Y10T 29/49963* (2015.01)

(58) Field of Classification Search
CPC .............. Y10T 403/21; Y10T 403/213; Y10T 403/217; F16B 2001/0078; F16B 5/02; F16B 5/0208; F16B 5/0225; F16B 5/0283; H04K 7/1407
See application file for complete search history.

(56) References Cited

U.S. PATENT DOCUMENTS

| | | | | |
|---|---|---|---|---|
| 2,370,327 A | * | 2/1945 | Rosan | F16B 13/12 411/80.2 |
| 2,455,885 A | * | 12/1948 | Theurer | 411/80.2 |
| 3,391,242 A | * | 7/1968 | Sudges | 174/16.3 |
| 3,566,947 A | * | 3/1971 | Jukes | F16B 37/122 29/523 |
| 4,266,267 A | * | 5/1981 | Ruegg | H01L 23/4006 174/16.3 |
| 4,907,124 A | * | 3/1990 | Kaufman | 361/722 |
| 7,589,970 B2 | * | 9/2009 | Hsieh | 361/707 |
| 2008/0099775 A1 | | 5/2008 | Yu et al. | |
| 2010/0322738 A1 | * | 12/2010 | Lau | 411/17 |
| 2011/0182067 A1 | | 7/2011 | Watanabe | |
| 2011/0248615 A1 | | 10/2011 | Tsai | |

OTHER PUBLICATIONS

Havanur, Sanjay, "Mounting and Handling Guidelines for TO-220 Packages", Alpha & Omega Semiconductor, Jun. 2007, 4 pages.
"How to Design TEC System", TEC App Note, Analog Technologies, Inc., last updated Jul. 30, 2012, 4 pages.

* cited by examiner

*Primary Examiner* — Michael P Ferguson

(57) ABSTRACT

A thermally-insulative insert device and method of use of same is disclosed. Specifically, the thermally-insulative insert device, comprising internal and external threads, allows attachment of an assembled part to a heat source while reducing heat transfer between the assembled part and the heat source. It is also an aspect of the present disclosure to provide easy-to-implement and cost-effective methods of using and assembling the thermally-insulative insert device.

16 Claims, 4 Drawing Sheets

View B-B

US 9,382,936 B2

THREADED INSERT WITH THERMAL INSULATION CAPABILITY

FIELD OF THE DISCLOSURE

The present disclosure is generally directed toward a thermally-insulative insert device and specifically directed toward a thermally-insulative insert device comprising internal and external threads.

BACKGROUND

Many products require management of heat transfer between product components. Solutions vary widely based on the application and design constraints. In electronics, relatively small components traditionally operate in proximity to heat sources, to include resistors, diodes, and power sources. Furthermore, some electronic components are secured to other components, such as a substrate, by metal screws, which serve to transfer thermal energy between components. Metal screws are used because of their low cost, strength and ease of use in assembly operations. Typically, size and manufacturability constraints in electronics applications prevent use of thermal wrappings or blankets common in, for example, large-scale industrial applications.

Traditional approaches to provide thermal management or control between product components operating in proximity to heat sources do not effectively or efficiently prevent or mitigate the transfer of thermal energy enabled by metallic attachment screws. Some attempts to control heat transfer between product components use specialized screws or threaded-components which raise cost and decrease manufacturing efficiencies.

SUMMARY

It is, therefore, one aspect of the present disclosure to provide a thermally-insulative insert device which allows attachment of an assembled part to a heat source or heat-carrying component while reducing heat transfer between the assembled part and the heat source or heat-carrying component. It is also an aspect of the present disclosure to provide easy-to-implement and cost-effective methods of using and assembling a thermally-insulative insert device in a larger system.

The thermally-insulative insert device, in some embodiments, is fitted with internal and external threads. The device's internal threads engage an attachment screw used to secure an assembled part to the heat source or heat-carrying component. The device's external threads engage the heat source or heat-carrying component. The thermally-insulative insert device is thereby positioned between the attachment screw and the heat source or heat-carrying component, serving to separate and to insulate the transfer of heat from the heat source or heat-carrying component, via the attachment screw, to the assembled part.

In one embodiment, a thermally-insulative threaded insert device is disclosed, the device comprising: an outer surface configured to threadably engage a heat source or heat-carrying component; and an inner surface configured to threadably engage a screw.

In one embodiment, a thermally-insulative threaded insert system is disclosed, the system comprising: an attachment screw comprising a screw head and a screw threaded portion; a thermally-conductive component; an assembly part; a thermally-insulative threaded insert device comprising: an outer surface configured to threadably engage the thermally-conductive component; and an inner surface configured to threadably engage the screw; an upper surface; a lower surface; wherein the screw head engages the assembly part, the screw threaded portion engages the internal surface and the thermally-conductive component engages the external surface; wherein the thermally-insulative threaded insert device reduces thermal communication between the assembly part and the thermally-conductive component.

In one embodiment, a method of assembling a thermally-insulative threaded insert device system is disclosed, the method comprising: providing a heat source; tapping a hole into the heat source or a component thermally-coupled to the heat source; inserting a thermally-insulative threaded insert device into the hole, the insert device comprising: an outer surface configured to threadably engage the hole; an inner surface configured to threadably engage a screw; an upper surface comprising a flange; and a lower surface; positioning an assembled part above and adjacent the flange of the insert device; and inserting a screw into the threaded insert device wherein the screw head engages the assembly part and the screw threaded portion engages the internal surface; wherein the thermally-insulative threaded insert device reduces thermal communication between the assembly part and the heat source.

The present disclosure will be further understood from the drawings and the following detailed description. Although this description sets forth specific details, it is understood that certain embodiments of the invention may be practiced without these specific details.

BRIEF DESCRIPTION OF THE DRAWINGS

The accompanying drawings, which are incorporated in and constitute a part of the specification, illustrate embodiments of the disclosure and together with the general description of the disclosure given above and the detailed description of the drawings given below, serve to explain the principles of the disclosures.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

Figure 1A:
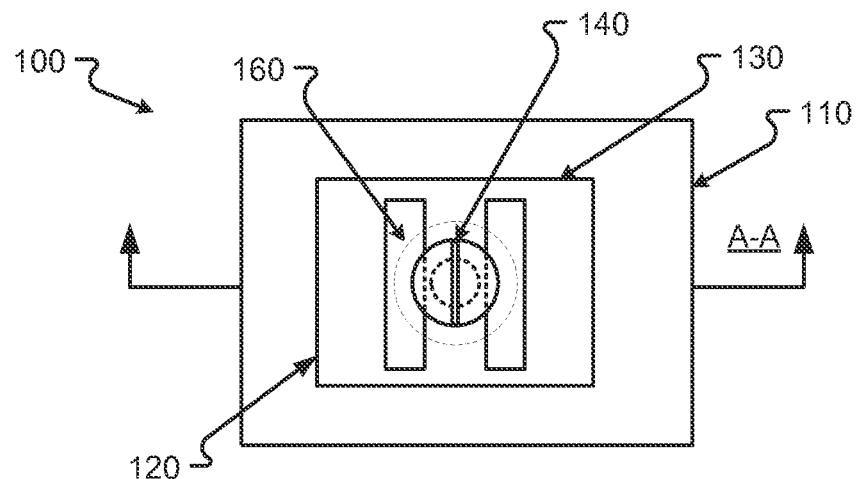
Figure 1B:
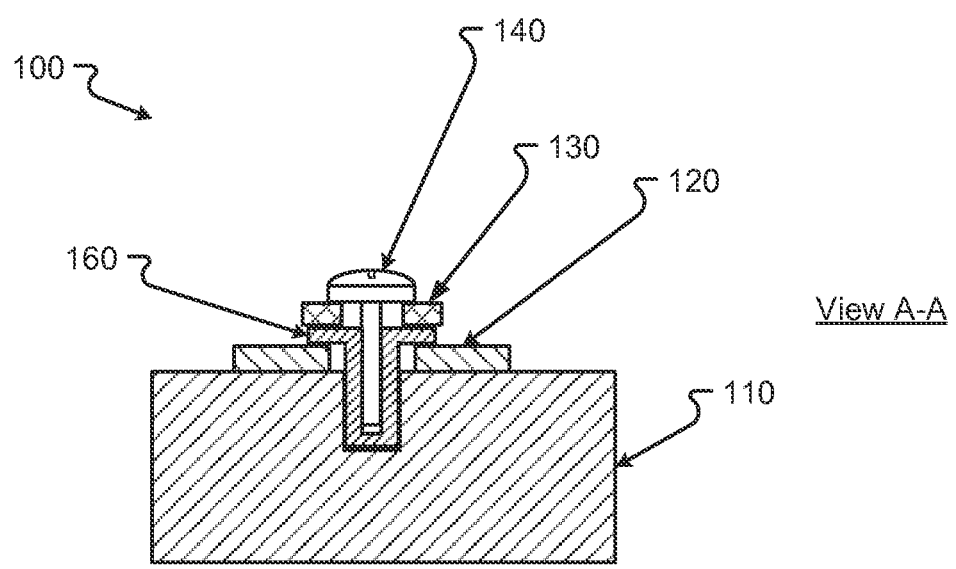
Figure 2A:
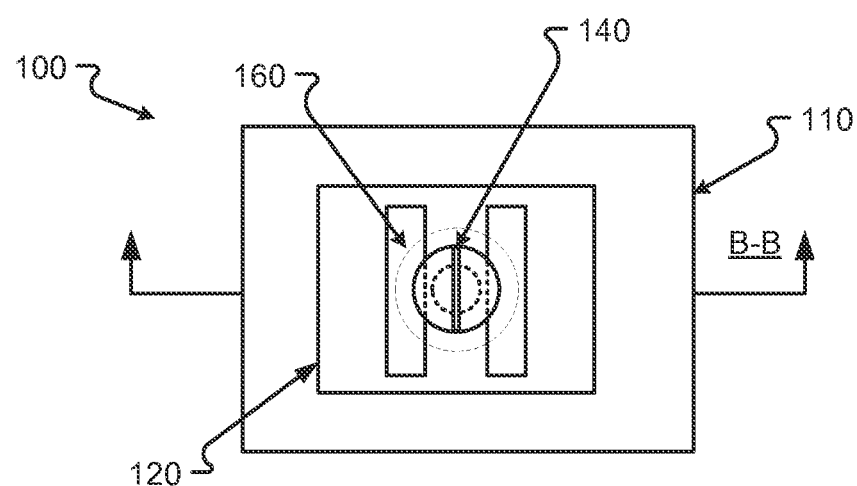
Figure 2B:
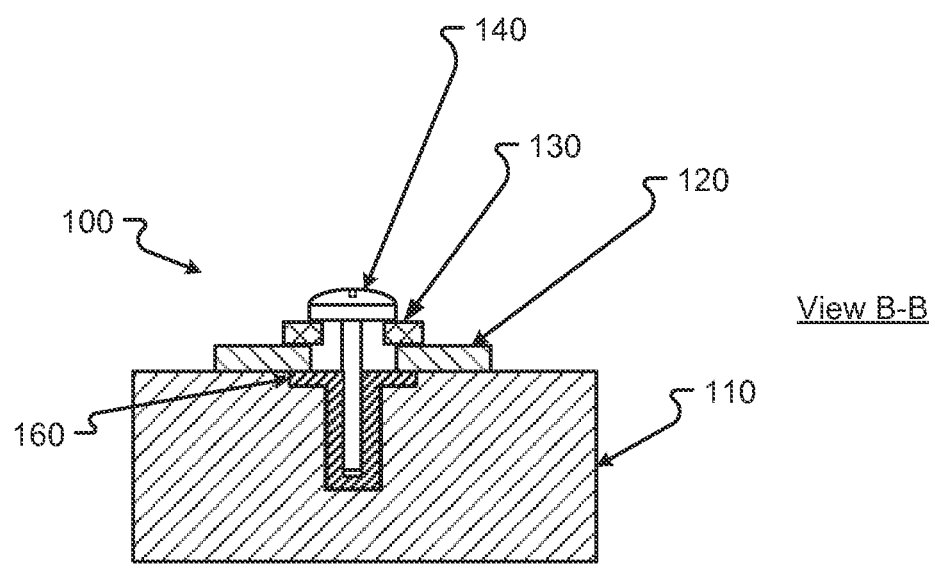
Figure 3:
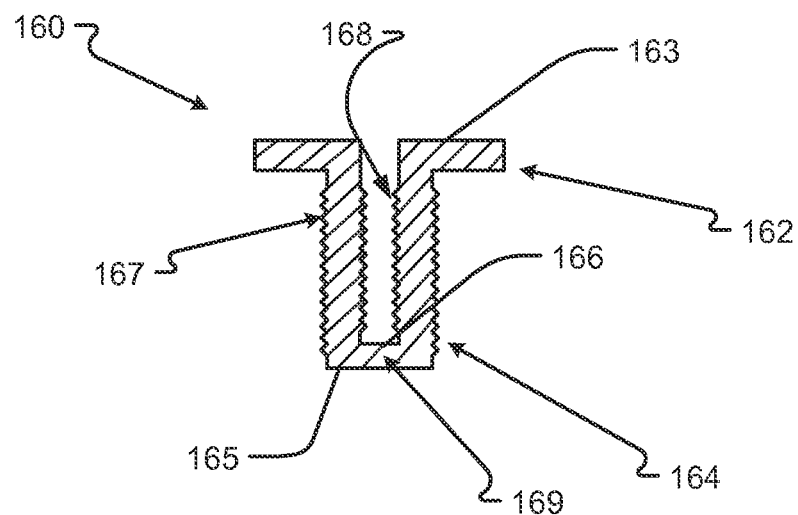
Figure 4:
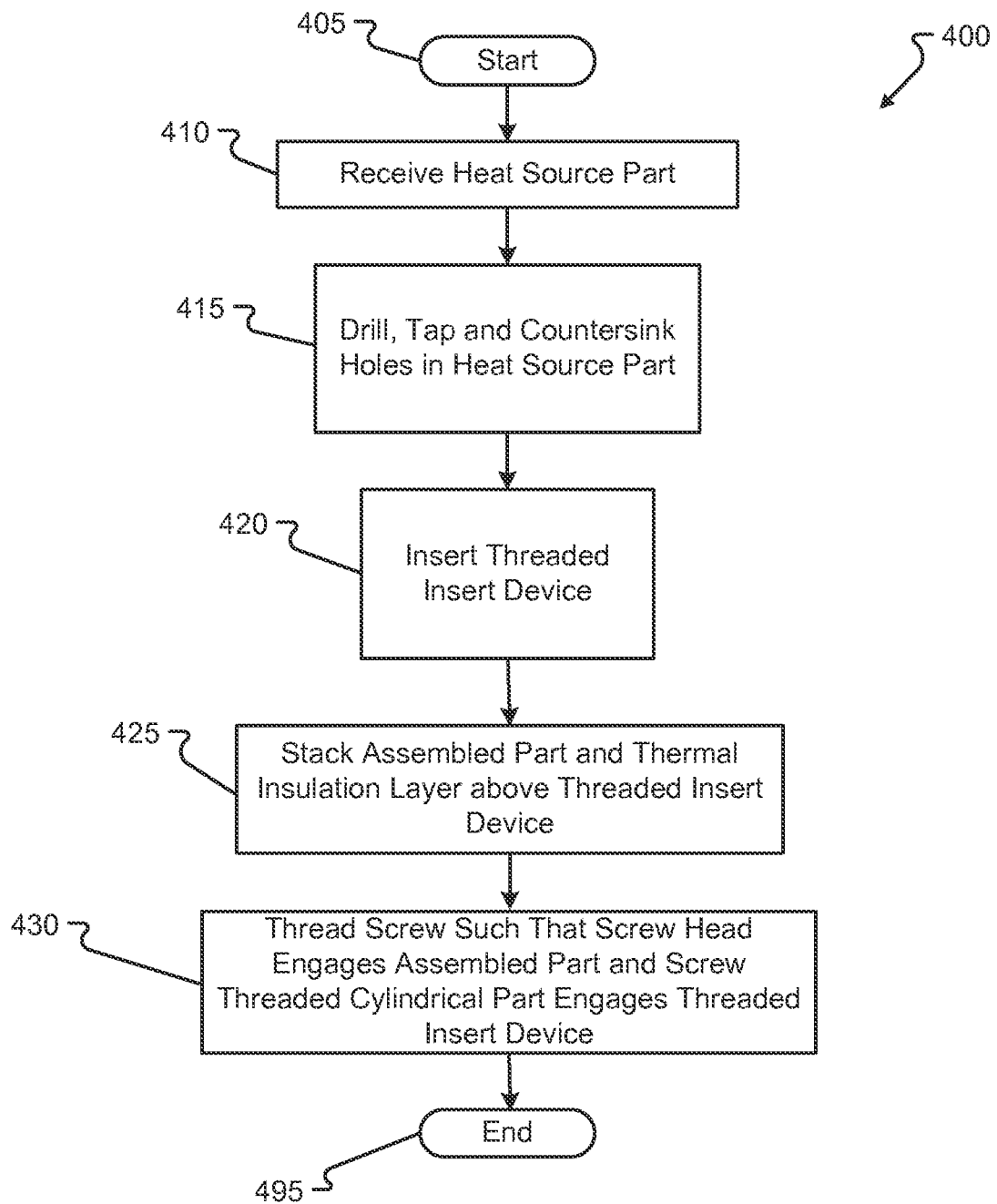

The present disclosure is described in conjunction with the appended figures:

FIG. 1A is a top-view of a first assembled system in accordance with at least some embodiments of the present disclosure;

FIG. 1B is a cross-sectional side-view along line A-A depicted in FIG. 1A;

FIG. 2A is a top-view of a second assembled system in accordance with at least some embodiments of the present disclosure;

FIG. 2B is a cross-sectional side-view along line B-B depicted in FIG. 2A;

FIG. 3 is detailed cross-sectional side-view of a thermally-insulative threaded insert device in accordance with at least some embodiments of the present disclosure; and FIG. 4 is a flow-diagram representation of a method of employing a thermally-insulative threaded insert device in an assembled system in accordance with at least some embodiments of the present disclosure.

DETAILED DESCRIPTION

The ensuing description provides embodiments only, and is not intended to limit the scope, applicability, or configuration of the claims. Rather, the ensuing description will provide those skilled in the art with an enabling description for implementing the described embodiments. Preferred embodiments are described to illustrate the present invention, not to limit its scope, which is defined by the claims. Like elements in various embodiments are commonly referred to with like reference numerals. It being understood that various changes may be made in the function and arrangement of elements without departing from the spirit and scope of the appended claims.

Referring now to FIGS. 1-4, representations and configurations of a device and system, and methods of use of the device and system, are shown.

In regard to FIGS. 1A-B, corresponding top and cross-sectional side views of a first assembled system 100 are provided. FIG. 1A is a top-view of the system 100 and FIG. 1B is the corresponding cross-sectional side view along section line A-A. The system 100 and components thereof will be described in accordance with at least some embodiments of the present disclosure. It should be appreciated that assembled parts and functions thereof can be found in many different fields of application—particularly where heat transfer or thermal management are of concern. Specifically, the features and functions disclosed herein can be employed in any assembled system where one component is desired to be thermally or electrically insulated from another component.

The illustrative system 100 depicted in FIGS. 1A-B includes a heat source 110 or thermally-conductive component that is thermally coupled to a heat source (termed a "heat source" herein for ease of discussion), thermal insulation layer 120, assembly part 130, screw 140 and thermally-insulative threaded insert device 160. The threaded insert device 160, in some embodiments, is inserted into a hole or void of the heat source 110 by external threads (see FIG. 3) disposed on an outer circumference of the insert device 160. The screw 140 is threaded into the interior or inner circumference of the insert device 160. The screw 140, in some embodiments, may correspond to a traditional screw as used, for example, in the fabrication of electronic assemblies, mechanical assemblies, etc. The screw 140 is commonly made of a conductive material, such as a metallic material like steel, aluminum, a conductive composite, etc. The head of the screw 140 rests on or interfaces with a top of the assembly part 130. As such, the assembly part 130 is disposed between the screw head and the insert device 160.

The insert device 160, in some embodiments, comprises a dual-cylindrical shape—that is a bottom portion of the insert device 160 may be shaped similar to a cylinder of a first circumference while a top portion of the insert device 160 may be shaped similar to a cylinder of a second circumference. As can be seen in FIGS. 1A and 1B, the top portion of the insert device 160 may be flatter than the bottom portion and, therefore, may have more of a disk shape than an extended cylindrical shape as exhibited by the bottom portion. As can be specifically seen in FIG. 1A, the shape of the top portion of the insert device 160 when viewed from above may be generally circular. It should be appreciated, however, that the insert device 160 may alternatively have a non-circular top portion. For instance, the top portion of the insert device 160 may be polygonal with one or more straight edges (e.g., triangle, rectangle, hexagon, quadrilateral, irregular polygon, etc.) that can accommodate a wrench or the like.

A thermal insulation layer 120 may be disposed between the heat source 110 and the top portion of the insert device 160, as shown. In this, the thermally-insulative threaded insert device 160 reduces thermal communication between the assembly part 130 and the heat source 110 in that the thermal communication between the assembly part 130 and the heat source 110 by way of the (conductive) screw 140 must pass through the thermally insulative threaded insert device 160. In some configurations, the thermal insulation layer 120 may be absent, and thus the bottom surface of the top portion of the thermally insulative threaded insert device 160 rests directly on top of the heat source 110.

A second configuration of the system 100 is depicted in FIGS. 2A-B. FIGS. 2A-B provide corresponding top and cross-sectional side views of the system 100 in the second configuration. FIG. 2A is a top-view of the system 100 and FIG. 2B is the corresponding cross-sectional side view along section line B-B.

In the configuration depicted of FIGS. 2A-B, the system 100 is shown to include a heat source 110, thermal insulation layer 120, assembly part 130, screw 140 and thermally-insulative threaded insert device 160. In this configuration, the threaded insert device 160 is inserted substantially flush with the upper surface of the heat source 110. In other words, an upper surface of the top portion of the insert device 160 is substantially co-planar with the upper surface of the heat source 110. This configuration results in a lower profile of the assembled stack of screw 140, assembly part 130 and thermal insulation layer 120.

The configuration of FIGS. 2A-B may be accommodated by first tapping a hole (threaded or un-threaded) into the heat source 110, and then counter-sinking a portion of the tapped hole to allow the flush-fitting of the insert device 160. The screw 140 may then be threaded into the interior of the insert device 160. The screw head of the screw 140 thus rests on top of the assembly part 130. As such, the assembly part 130 is disposed between the screw head and the insert device 160. A thermal insulation layer 120 may be disposed between the heat source 110 and a portion of the top portion of the insert device 160 and a portion of the heat source 110 upper surface, as shown. In this configuration of the system 100, the thermally-insulative threaded insert device 160 reduces thermal communication between the assembly part 130 and the heat source 110 in that the thermal communication between the assembly part 130 and the heat source 110 by way of the (metallic) screw 140 must pass through the thermally insulative threaded insert device 160.

FIG. 3 depicts a detailed cross-sectional side-view of the thermally-insulative threaded insert device 160 in accordance with at least some embodiments of the present disclosure. The insert device 160 comprises an top portion 162, bottom portion 164, interior or inner surface 168 with screw threads and exterior or outer surface 167 with screw threads. The top portion 162, in some embodiments, forms a flange with an upper surface 163. The insert device 160 also comprises a lower exterior surface 165 and lower interior surface 166, and, in some embodiments, is generally circular when view from above or below. The top portion 162 may include a flange, as shown.

In one embodiment, the external threads 167 are absent and the insert device 160 engages the heat source 110 by an interference fit (e.g., a radius of the bottom portion 164 is greater proximate to the top portion 162 than a radius of the bottom portion 164 that is distal to the top portion 162). In another embodiment, the external threads 167 are absent and the insert device 160 engages the heat source 110 with a gap wherein a glue or adhesive is applied to secure the insert device 160 within the hole of the heat source 110. In yet another embodiment, the insert device 160 does not comprise a flange at the top portion 162, but rather is of a substantially uniform circular cross-section meaning that the circumference of the top portion 162 is substantially similar or identical to the circumference of the bottom portion 164.

The thermally insulative threaded insert device 160, in some embodiments, is formed of a thermally-insulating material to include one or more of plastics, nylons, polycarbonate, rubber, wood, and other materials known to those skilled in the art to provide thermal insulation. In one embodiment, the thermally-insulative threaded insert device 160 is constructed of a plastic material or plastic composite. For example, the material may comprise polyethylene terephthalate (PET), polyethylene terephthalate glycol (PET G), crystalline PET (PET-C) i.e. a biaxially stretched polyethylene terephthalate.

Thermally insulative threaded insert device 160 may be solid or may be configured to form a chamber and/or void internally. The chamber and/or void may be filled with a different material than that forming the void or chamber. The chamber may be configured to form a vacuum or; the vacuum may be filled with air or other known gases with non-conductive properties. In some embodiments, the insert device 160 may be manufactured using an injection molding process, blow molding process, casting process, etc. In other embodiments, the insert device 160 may comprise a metal that is plated or coated with a non-conductive material, thereby making the entirety of the exposed surface of the insert device 160 non-conductive.

In one embodiment, the assembly part 130 is an element that generates heat and the heat source 110 is not an element that generates heat. For example, the assembly part 130 may comprise a light source which generates heat, and the heat source 110 may comprise a non-conductive mounting plate. In such an embodiment, the thermally insulative threaded insert device 160 still functions, among other things, to secure the assembly part 130 and the heat source 110 without serving as a conduit for thermal heat transfer.

The term "screw" may include other attachment means, such as pins without external threads, pins with leaf-spring type attachments and interference-fit type pins. The screw may be formed of any metallic materials or constructions known to those skilled in the art.

The heat source may be any heat-transfer element known to those skilled in the art, to include heat sources contained in an integrated circuit or mounting board of an apparatus, or any surface mount device (SMD) or pin through hole (PTH) configuration capable of generating heat. The heat source 110 may be a heat sink, a metal connected to an LED, and heat sources associated with LED lighting applications. The heat source 110 may be made of a material consisting of copper, aluminum, titanium, tungsten, silicon carbide, a conductive epoxy, a conductive polymer, a metal and any material known to one skilled in the art to act as a conductive element. In one embodiment, the conductive element 110 is a plate.

An embodiment of a method of creating an assembled system by using one or more insert device 160 will now be described with reference to FIG. 4.

A general order for the steps of the method 400 of a method of assembling a thermally insulative threaded insert device system is shown in FIG. 4. The method 400 starts with a start operation 405 and ends with an end operation 495. The method 400 can include more or fewer steps or can arrange the order of the steps differently than those shown in FIG. 4.

Hereinafter, the method 400 shall be explained with reference to the systems, components, elements, etc. described in conjunction with FIGS. 1-3. The method 400, in some embodiments results in an assembled system 100 as shown in either FIGS. 1A-B or FIGS. 2A-B.

After beginning the method with start operation 405, a heat source 110 is received, as depicted in step 410. The heat source 110 may host a plurality of assembly parts 130, although such a configuration is not required.

In step 415, one or more holes are drilled or tapped into the heat source 110. Any of several methods know to those skilled in the art for drilling and tapping holes may be used. A counter-sink is also optionally formed at the upper end of the tapped hole to enable the flange-equipped thermally insulative threaded insert device 160 (as shown in FIG. 3) into the heat source 110 so as to present a substantially planar surface at the intersection of the insert device edge and heat source 110. The hole may alternatively be first drilled, then a countersink formed, and then tapped. Any means known to those skilled in the art for providing a countersink may be used.

In step 420, the thermally insulative threaded insert device 160 is inserted into the hole of the heat source 110. The insert device 160 may be inserted such that the flange of the insert device 160 fits within the counter-sink of the tapped hole of the heat source 110.

In step 425, the thermal insulation layer 120 is stacked above the flush-mounted flange of the insert device 160 and heat source 110, and the assembled part 130 is positioned above the thermal insulation layer 120.

In step 430, the screw 140 is threaded into the interior of the insert device 160 such that the screw head 140 engages the assembly part 130, wherein the thermally-insulative threaded insert device reduces thermal communication between the assembly part and the heat source.

The process ends at step 495 in producing one or more thermally insulative threaded insert device systems 100.

While the pictorial representations and flowcharts have been discussed and illustrated in relation to a particular sequence of events, it should be appreciated that changes, additions, and omissions to this sequence can occur without materially affecting the operation of the disclosed embodiments, configuration, and aspects.

The present disclosure, in various aspects, embodiments, and/or configurations, includes components, methods, processes, systems and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An assembled system comprising:
   an attachment screw comprising a screw head and a screw threaded shaft portion;
   a heat source comprising a threaded aperture;
   an assembly part having a through hole;
   a thermally-insulative threaded insert device comprising:
   a bottom portion comprising a threaded cylindrical outer surface configured to engage the threaded aperture;
   a threaded cylindrical inner surface defining an aperture configured to threadably engage the attachment screw; and
   a top portion comprising an annular flange; and
   a thermal insulation part having a through hole, the thermal insulation part disposed between the thermally-insulative threaded insert device and the screw head, an upper surface of the thermal insulation part being engaged with a lower surface of the assembly part with the through holes of the assembly part and the thermal insulation part being aligned;
   wherein the screw threaded shaft portion of the attachment screw passes through the aligned through holes in the assembly part and the thermal insulation part such that the screw head engages an upper surface of the assembly part, and wherein the screw threaded shaft portion engages the inner surface within the aperture of the thermally-insulative threaded insert device and the threaded aperture of the heat source threadably engages the outer surface of the thermally-insulative threaded insert device;
   wherein the flange forms a substantially planar surface with an upper surface of the heat source by fitting within a counterbore of the upper surface of the heat source, and wherein a lower surface of the thermal insulation part engages an upper surface of the flange and the upper surface of the heat source; and
   wherein the thermally-insulative threaded insert device reduces thermal communication between the assembly part and the heat source.

2. The system of claim 1, wherein the outer surface and the inner surface of the thermally-insulative threaded insert device each comprise a first insulative material.

3. The system of claim 1, wherein the top portion of the thermally-insulative threaded insert device comprises a first circumference and the bottom portion of the thermally-insulative threaded insert device comprises a second circumference.

4. The system of claim 1, wherein the annular flange comprises a shape that is at least one of circular and rounded.

5. The system of claim 1, wherein the threaded cylindrical outer surface of the thermally-insulative threaded insert device and the threaded cylindrical inner surface of the thermally-insulative insert device are substantially concentric.

6. The system of claim 1, wherein the thermally-insulative threaded insert device is constructed of a solid non-conductive material.

7. The system of claim 1, wherein the top portion of the thermally-insulative threaded insert device comprises a first cross-sectional radius and the bottom portion comprises a second cross-sectional radius that is smaller than the first cross-sectional radius.

8. The system of claim 1, further comprising threads disposed on a continuous circumference of the outer surface of the thermally-insulative threaded insert device.

9. An apparatus comprising:
   a first assembly component comprising a heat source with a threaded aperture;
   an assembly part having a through hole;
   a screw comprising a screw head and a screw threaded shaft portion;
   a thermally-insulative threaded insert, the thermally-insulative threaded insert including a bottom portion comprising a threaded cylindrical outer surface which threadably engages the threaded aperture, a threaded cylindrical inner surface defining an aperture which threadably engages the screw, and a top portion comprising an annular flange; and
   a thermal insulation part having a through hole, the thermal insulation part disposed between the thermally-insulative threaded insert and the screw head, an upper surface of the thermal insulation part being engaged with a lower surface of the assembly part, with the through holes of the assembly part and the thermal insulation part being aligned;
   wherein the screw threaded shaft portion of the screw passes through the aligned through holes of the assembly part and the thermal insulation part such that the screw head engages an upper surface of the assembly part, and wherein the screw threaded shaft portion engages the inner surface of the aperture of the thermally-insulative threaded insert device, and the threaded aperture of the heat source threadably engages the outer surface of the thermally-insulative threaded insert;
   wherein the flange forms a substantially planar surface with an upper surface of the heat source by fitting within a counterbore of the upper surface of the heat source, and wherein a lower surface of the thermal insulation part engages an upper surface of the annular flange and the upper surface of the heat source;
   wherein the thermally-insulative threaded insert reduces thermal communication between the assembly part and the heat source.

10. The apparatus of claim 9, wherein the outer surface and the inner surface of the thermally-insulative threaded insert each comprise a first insulative material.

11. The apparatus of claim 9, wherein the outer and inner surfaces of the thermally-insulative threaded insert are substantially concentric.

12. The apparatus of claim 9, wherein the thermally-insulative threaded insert is constructed of a solid non-conductive material.

13. The apparatus of claim 9, wherein the top portion of the thermally-insulative threaded insert comprises a first cross-sectional radius and the bottom portion comprises a second cross-sectional radius that is smaller than the first cross-sectional radius.

14. The apparatus of claim 9, wherein the top portion of the thermally-insulative threaded insert comprises a first circumference and the bottom portion of the thermally-insulative threaded insert comprises a second circumference.

15. The apparatus of claim 9, wherein the annular flange comprises a shape that is at least one of circular and rounded.

16. The apparatus of claim 9, further comprising threads disposed on a continuous circumference of the outer surface of the thermally-insulative threaded insert.

* * * * *